US011361090B2

(12) United States Patent
Shadrin et al.

(10) Patent No.: US 11,361,090 B2
(45) Date of Patent: Jun. 14, 2022

(54) SYSTEM AND METHOD FOR ENABLING AN INTERPROCESS COMMUNICATION IN ELECTRONIC CONTROL UNITS OF VEHICLES

(71) Applicant: AO Kaspersky Lab, Moscow (RU)

(72) Inventors: Alexander V Shadrin, Moscow (RU); Dmitry A Kulagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/160,603

(22) Filed: Jan. 28, 2021

(65) Prior Publication Data

US 2021/0397724 A1 Dec. 23, 2021

(30) Foreign Application Priority Data

Jun. 19, 2020 (RU) .......................... RU2020120450

(51) Int. Cl.
*G06F 3/00* (2006.01)
*G06F 21/60* (2013.01)
*G06F 9/54* (2006.01)

(52) U.S. Cl.
CPC .............. *G06F 21/604* (2013.01); *G06F 9/54* (2013.01)

(58) Field of Classification Search
CPC ........................................................ G06F 9/54
USPC ......................................................... 719/310
See application file for complete search history.

(56) References Cited

U.S. PATENT DOCUMENTS

| | | | | |
|---|---|---|---|---|
| 5,761,669 A | * | 6/1998 | Montague | ............... H04L 29/06 707/999.103 |
| 2015/0347774 A1 | * | 12/2015 | Krstic | ................. G06F 21/6218 726/29 |
| 2017/0005983 A1 | | 1/2017 | Doukhvalov et al. | |
| 2020/0074097 A1 | * | 3/2020 | Hamlin | ................... H04L 63/10 |

FOREIGN PATENT DOCUMENTS

DE          102018202446 A1     8/2019

OTHER PUBLICATIONS

Ron Herardian, Basil Policy-as-code Platform. (Year: 2001).*
Kim Thuat Nguyen, Lightweight Security Protocols for IP-based Wireless Sensor Networks and the Internet of Things (Year: 2016).*

* cited by examiner

*Primary Examiner* — Lechi Truong
(74) *Attorney, Agent, or Firm* — ArentFox Schiff LLP; Michael Fainberg

(57) ABSTRACT

A method for providing an interprocess interaction in an electronic control unit having an operating system defining a kernel space, wherein the method involves steps in which: the kernel of the operating system intercepts a request for an interprocess communication between a first application and a second application of the electronic control unit. A verdict is requested, from an access control component of the operating system, with respect to granting access for the requested interprocess communication between the first application and the second application of the electronic control unit. The access control component generates the verdict for the requested interprocess communication based on a security policy. The kernel of the operating system selectively allows the requested interprocess communication between the first application and the second application based on the generated verdict.

14 Claims, 8 Drawing Sheets

SYSTEM AND METHOD FOR ENABLING AN INTERPROCESS COMMUNICATION IN ELECTRONIC CONTROL UNITS OF VEHICLES

CROSS-REFERENCE TO RELATED APPLICATION

The present application claims priority to a Russian Application No. 2020120450 filed on Jun. 19, 2020, which is incorporated by reference herein.

FIELD OF TECHNOLOGY

The invention relates to the field of computer operating systems, and more specifically, to systems and methods for enabling an interprocess communication in electronic control units of vehicles.

BACKGROUND

At present, the automotive industry is developing rapidly along with the development of various technologies. New information and control systems can be implemented by vendors that allow the vehicle software system a more comfortable control of the automobile. The various information and control systems of the automobile are controlled by control units which in turn carry out various algorithms. Thus, for example, in order to comply with the regulations of the EURO ecological standards (EURO-4, EURO-5), auto makers need to optimize not only the engines, but also the control systems for these engines in order to ensure ecological exhaust mandated by the regulations, while also ensuring the power characteristics do not become worse. The gearbox control systems designed for a more adaptive ride are being optimized to enable adaptation to the driving style, the road and weather conditions, various manners of shifting the transmission, and changing the torque transmission between the wheel axles. Currently, more complex advanced driver-assistance systems (ADAS) are being adopted, such as, for example, an automated parking system, a driving assistance system, or an automated emergency braking system. The automated parking system in a vehicle uses sensors which determine the distance from the vehicle to an obstacle. The driving assistance system in a vehicle uses a camera to recognize the position of the vehicle in a lane and on the road in general. The automated emergency braking system is configured to help drivers with braking when an obstacle is detected by the vehicle's infrared sensors. Furthermore, electric vehicles and/or hybrid electric vehicles gain popularity, the movement of which is being controlled by control systems located on board of these vehicles. With the rapid development of information technologies, the issue of self-driving modes of transportation (both cars and trucks) is also becoming increasingly relevant.

Currently, conventional standards exist for platforms on which the control units are operating. The automobile control units for critical components (such as the steering or the braking system) are implemented according to standards which are subject to heightened safety requirements. Moreover, such control units for critical components usually operate on a single-core processor with limited resources. For example, such control units may be implemented using specialized microcontrollers with low CPU performance and limited memory capacity. On the other hand, the multimedia systems may lack heightened safety requirements, since their operation (playback of media files or display of a geoposition on a map) does not typically directly affect the safety of the persons riding in the vehicle. The aforementioned driver assistance and control methods represent an "interlayer" between multimedia and safety units. The driver assistance systems are subject to heightened safety requirements. In certain control units, real-time systems are used, which in turn also limit the algorithms which can be supported by the units.

AUTomotive Open System ARchitecture (AUTOSAR) is a global development partnership of automotive interested parties founded in 2003. It pursues the objective to create and establish an open and standardized software architecture for automotive electronic control units (ECUs)—the Autosar Adaptive Platform (AAP). Among the key features of this standard are the requirements for ensuring the information security of the systems built on the AAP basis.

The known AAP standards place high-level demands on the security subsystem. The AAP standards contemplate various approaches to the design of the security subsystem. For example, one implementation of a security subsystem may use several decision making points for providing access between the interfaces of the applications. These decision making points may be implemented in the form of additional applications working under the control of the AAP platform. These techniques prevent the creation of an access control security subsystem with specified properties, such as a complete description of the security policies, their mutual compatibility, and the ability to specify complex and comprehensive security policies. Thus, it should be noted that the existence of several decision making points for granting access may not allow a distinct prognostication of how the system as a whole will behave if one or more decision making points are compromised by hackers.

It also means that it is possible to compromise the aforementioned control units in present-day conditions. An automobile is often left unattended by the driver with access to the interior (for example, when being washed, during seasonal tire changing or unscheduled maintenance by various vendors other than an official dealer). Hackers may be able to connect directly to the control unit (by cable, or through a malicious storage medium utilizing a data interchange port, such as USB). As a result, at least one of the control units and at least one decision making point may be compromised.

Thus, there is a need to solve the above-described problems.

SUMMARY

Disclosed are systems and methods in which there exists a single decision making point, and the software platform runs under the control of a secure operating system.

In one aspect, a method is proposed for providing an interprocess interaction in an electronic control unit having an operating system defining a kernel space, wherein the method involves steps in which: the kernel of the operating system intercepts a request for an interprocess communication between a first application and a second application of the electronic control unit. A verdict is requested, from an access control component of the operating system, with respect to granting access for the requested interprocess communication between the first application and the second application of the electronic control unit. The access control component generates the verdict for the requested interprocess communication based on a security policy. The kernel of the operating system selectively allows the requested interprocess communication between the first application and the second application based on the generated verdict.

In one aspect, the access control component has an exclusive authority to make access grant decisions with respect to the interprocess communication.

In one aspect, the security policy includes a list containing a plurality of data elements. Each of the plurality of data elements indicates at least an identifier of a client application, an identifier of a service application and an identifier of a service allowed to be performed by the service application.

In one aspect, the kernel sends to the access control component an identifier of the first application, an identifier of the second application and an identifier of a service to be performed by the second application. The access control component generates an affirmative verdict in response to finding a data element in the list matching the identifier of the first application, the identifier of the second application and the identifier of the service. The access control component generates a negative verdict in response to not finding a data element in the list matching the identifier of the first application, the identifier of the second application and the identifier of the service.

In one aspect, the kernel allows the requested interprocess communication based on the affirmative verdict generated by the access control component. The kernel blocks the requested interprocess communication based on the negative verdict generated by the access control component.

In one aspect, the list is created based on a specification defining access of a corresponding application to one or more services of a different application.

In one aspect, the specification includes at least one or more computing resources required by the corresponding application, run time environment conditions required by the corresponding application, one or more interfaces provided by the corresponding application.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for providing an interprocess communication in an electronic control unit. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
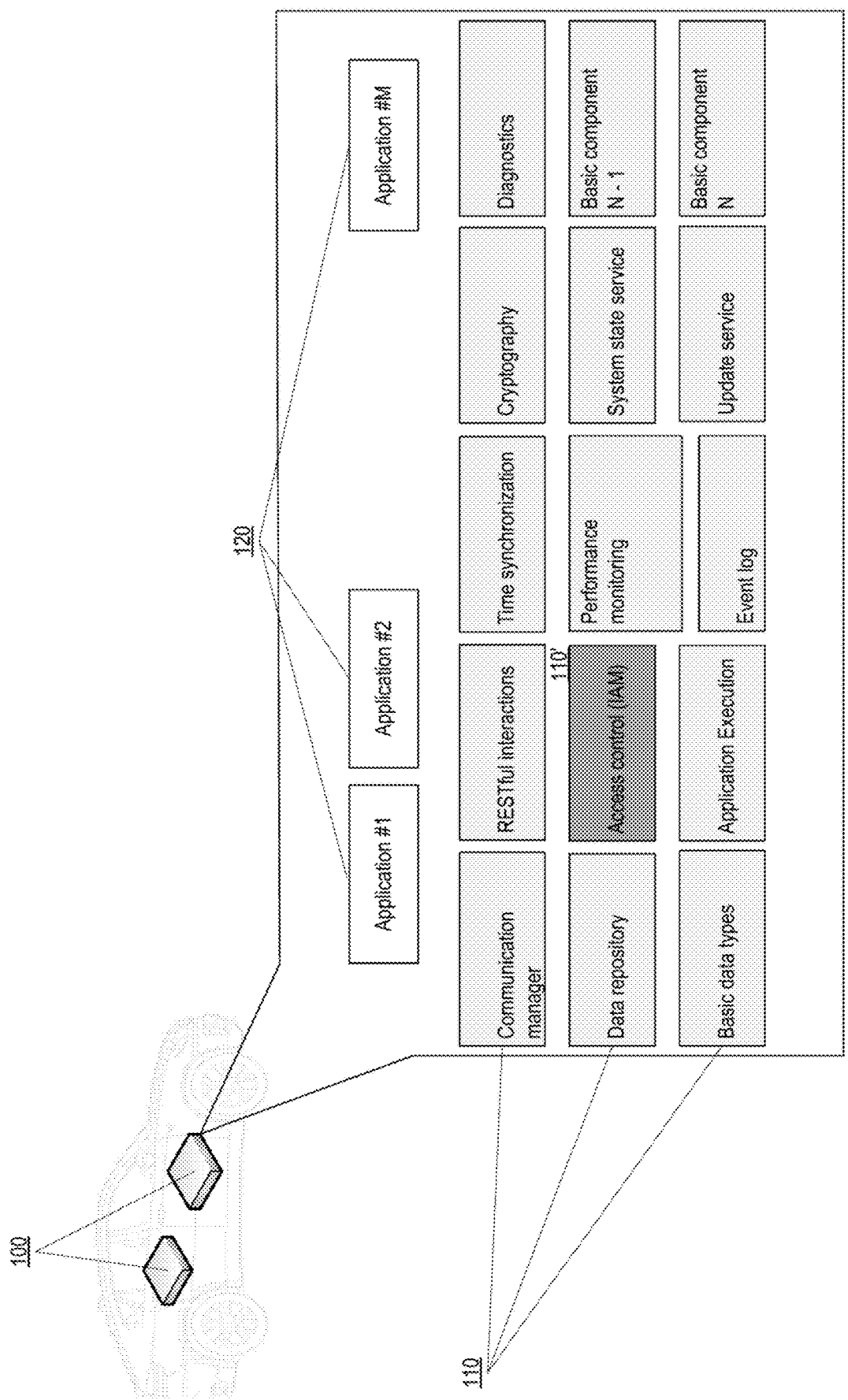
FIG. 1A shows a block diagram of the structure of the conventional system of the Autosar Adaptive Platform standard.

FIG. 1A shows a block diagram of the structure of the conventional system of the Autosar Adaptive Platform (AAP) standard.

Generally, a control system implemented using the AAP standard may run in a control unit (electrical control unit, ECU) 100 of a vehicle. The functionality of an AAP system may be performed by a set of basic components 110. As used herein, the term "basic component" refers to a software element of the platform (implemented, for example, in the form of an application, a system application or a service), as defined in the AAP specification, and necessary to its complete operation. One or more applications 120 may implement certain operation necessary for the control of the vehicle 100 according to the AAP standard. An application 120 may include, but is not limited to the binary executable code and a specification (manifest) describing the basic properties of the application. In one aspect, the application specification may be an ARXML document written in ARXML language (based on XML language).

In one aspect, the application specification may include at least:
the computing resources required for the execution of the application 120 (for example, the memory volume, the connection to certain ECU processor cores, and the like);
the runtime environment conditions required by the given application 120 (for example, the applications 120 of the driver assistance systems do not run when the engine is switched off);
the interfaces provided by the application 120 to other applications 120.

Advantageously, the specification of the application 120 may enable access to the services of other applications 120, abstracted from the particular embodiment of the interprocess communication (IPC) scheme between applications 120.

An application 120 may access (interact with) any of the basic components 110 of the AAP platform. In other words, one or more applications 120 may implement AAP functionality by utilizing the services provided by the interfaces of the basic components 110. Furthermore, an application 120 may access the other applications 120 through the interfaces provided by them. In the general case, it does not matter on which electronic control unit 100 the application 120 resides. The AAP standard provides mechanisms enabling a connection to other applications 120 residing on other control units 100 of the AAP platform in a way which is transparent to the applications 120.

Examples of the basic components 110 are illustrated in FIG. 1A, some of which are described below.

The application execution component may be configured to initiate or halt certain applications 120 based on the current state of the system. For example, if the automobile is parked with the engine switched off, the application execution component provides access to one set of applications in this state. If the automobile is moving, the application execution component provides access to another set of applications (some of which may include applications from the first set as well).

The interaction monitoring component (communication manager) may be configured to register the services being provided by the applications 120, to detect these services, and to provide an information interchange with these services.

The platform performance monitoring component (platform health manager) may be configured to monitor check points in the system and to monitor the proper running of the components 110 and the applications 120.

The time synchronization manager may be configured to provide a unified time for all systems of the vehicle, since the applications 120 are executed on different control units 100 within the vehicle.

The access control component (also referred to herein as Identity and Access Manager, IAM) 110' may be configured to identify and store all accessible interactions of the applications 120. For example, if an application B provides a certain service to application A, the interface of the service of application B may contain a set of methods described in the specification of application B. The access control component 110' may specify which methods of the service of application B can be accessed by application A. The same scheme may be utilized to determine which applications 120 can obtain access to the basic components 110 of the platform. In one aspect, the access control component 110' may analyze the specification of the applications 120 and may grant permission to perform one or more interactions.

The combination of the mentioned basic components 110 enables implementation of applications on AAP platform.

It is presumed in the AAP specification that the system may have components responsible for making security decisions (Policy Decision Points, PDP) and components responsible for executing these decisions (Policy Enforcement Points, PEP). No further details defining the functionality of these components are presented in the AAP specification Furthermore, it is noted that these functionality details can be defined individually in each embodiment of the AAP. For example, in one embodiment, the AAP platform may include the PDP and the PEP as supplemental applications 120 or mediators (an example of one embodiment is presented in FIG. 1C)

Figure 1B:
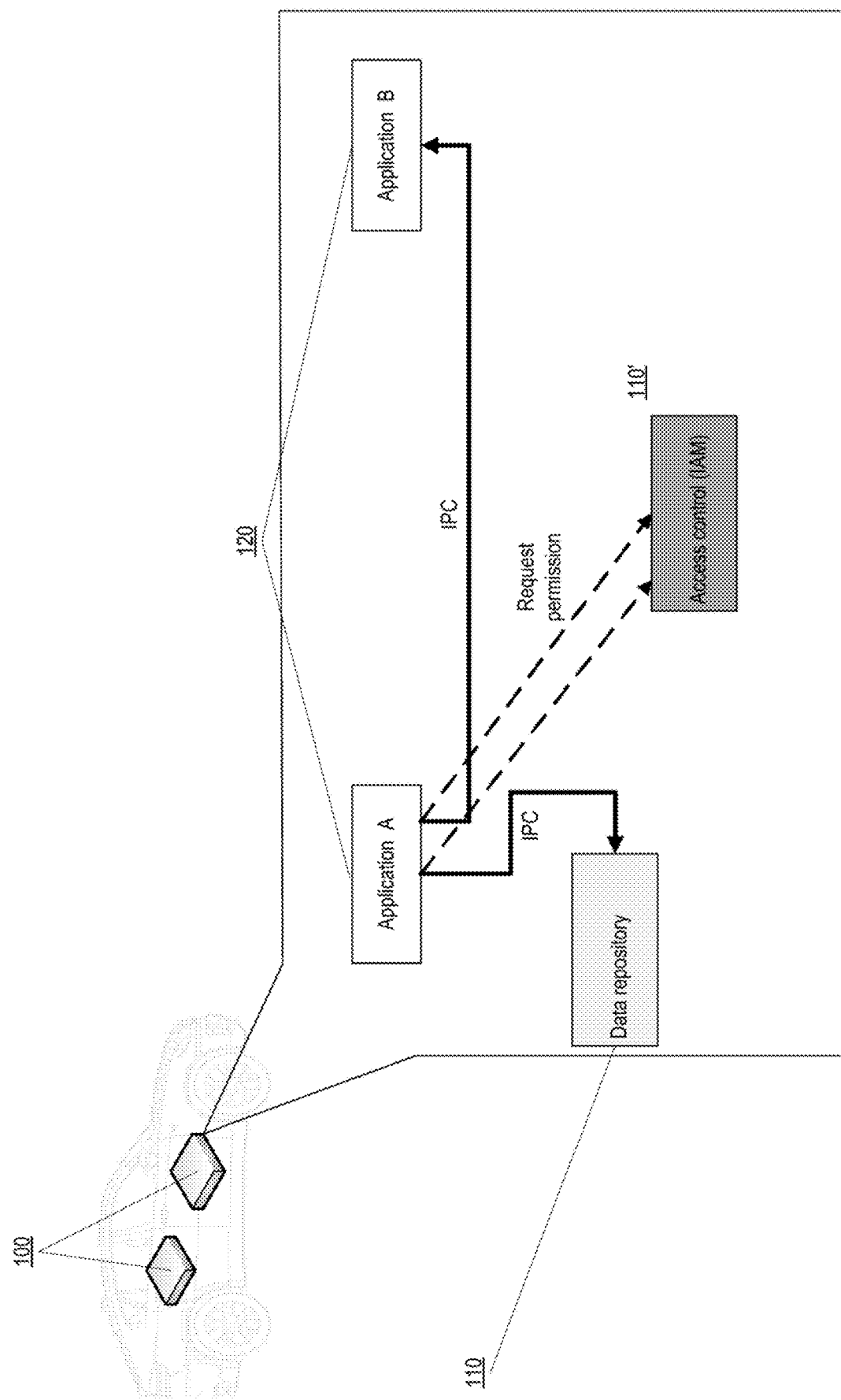
FIG. 1B shows a block diagram of an implementation of the scheme for providing access according to the specification of the Autosar Adaptive Platform standard.
Figure 1C:
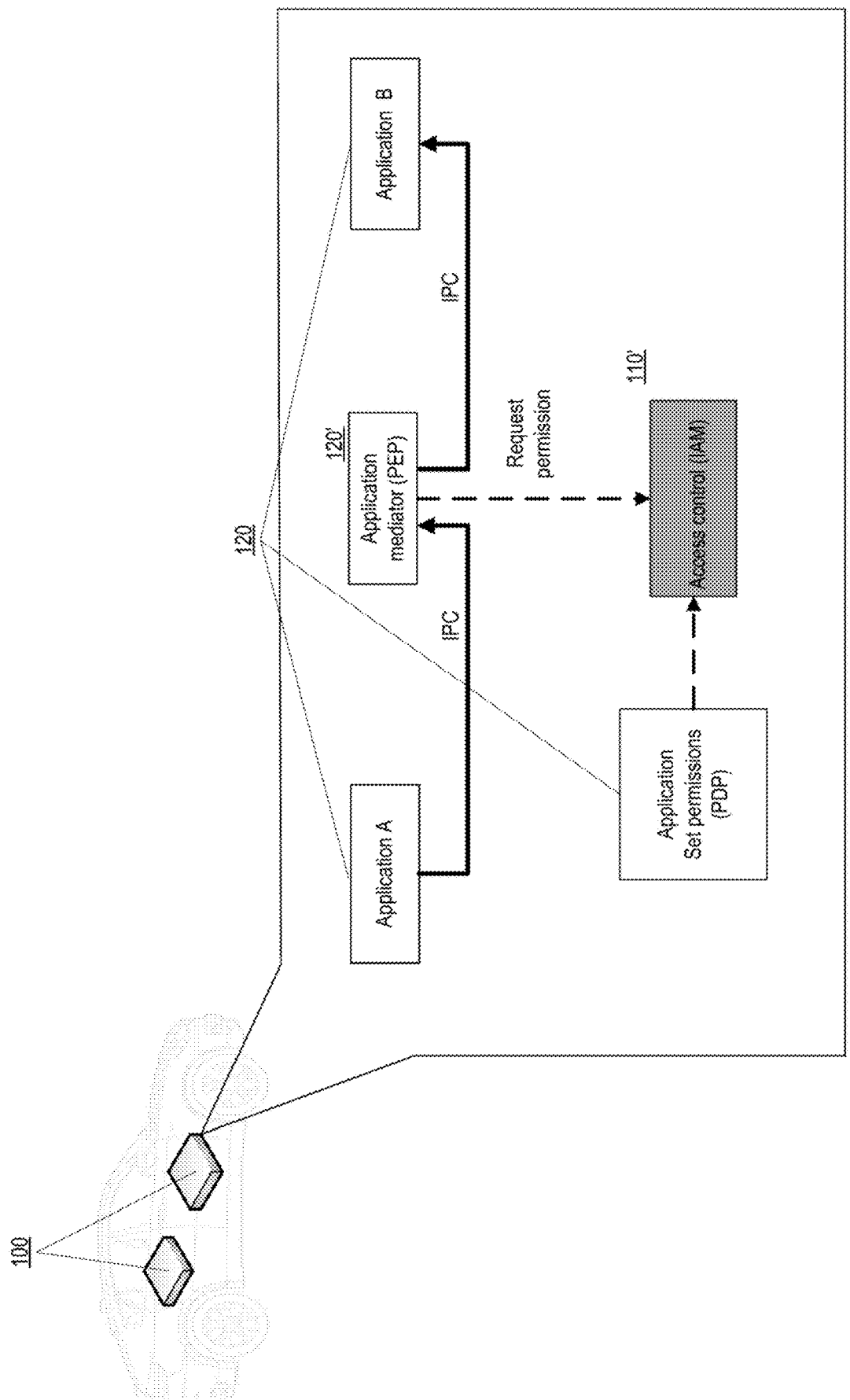
FIG. 1C shows a block diagram of an implementation of the scheme for providing access according to the specification of the Autosar Adaptive Platform standard with the use of mediators.

Variant schemes for granting access according to the specification of the AAP standard are illustrated in FIGS. 1B and 1C. For greater clarity, in FIGS. 1B and 1C requests for permission to interact are marked by dotted lines, while the interactions themselves (interprocess communications) are marked by solid lines.

As has been mentioned above, in the AAP standard, an application 120 or any basic component 110 needing permission for an interaction may obtain permission from the access control component 110'. FIG. 1B shows an example where application A, for interaction with application B and for interaction with a basic component, requests permission for the interprocess communication from the access control component 110'.

In another example of an embodiment of the AAP standard, the decision making point may be located inside the access control component 110' or be implemented in a particular application 120' (FIG. 1C). In the example shown in FIG. 1C, the application 120' works in concert with the access control component 110'. Furthermore, if complex security policies are needed, access control may even be implemented via several applications 120'. It should be noted that, in the given instance, the interprocess communication is also implemented through the application 120'.

Figure 2A:
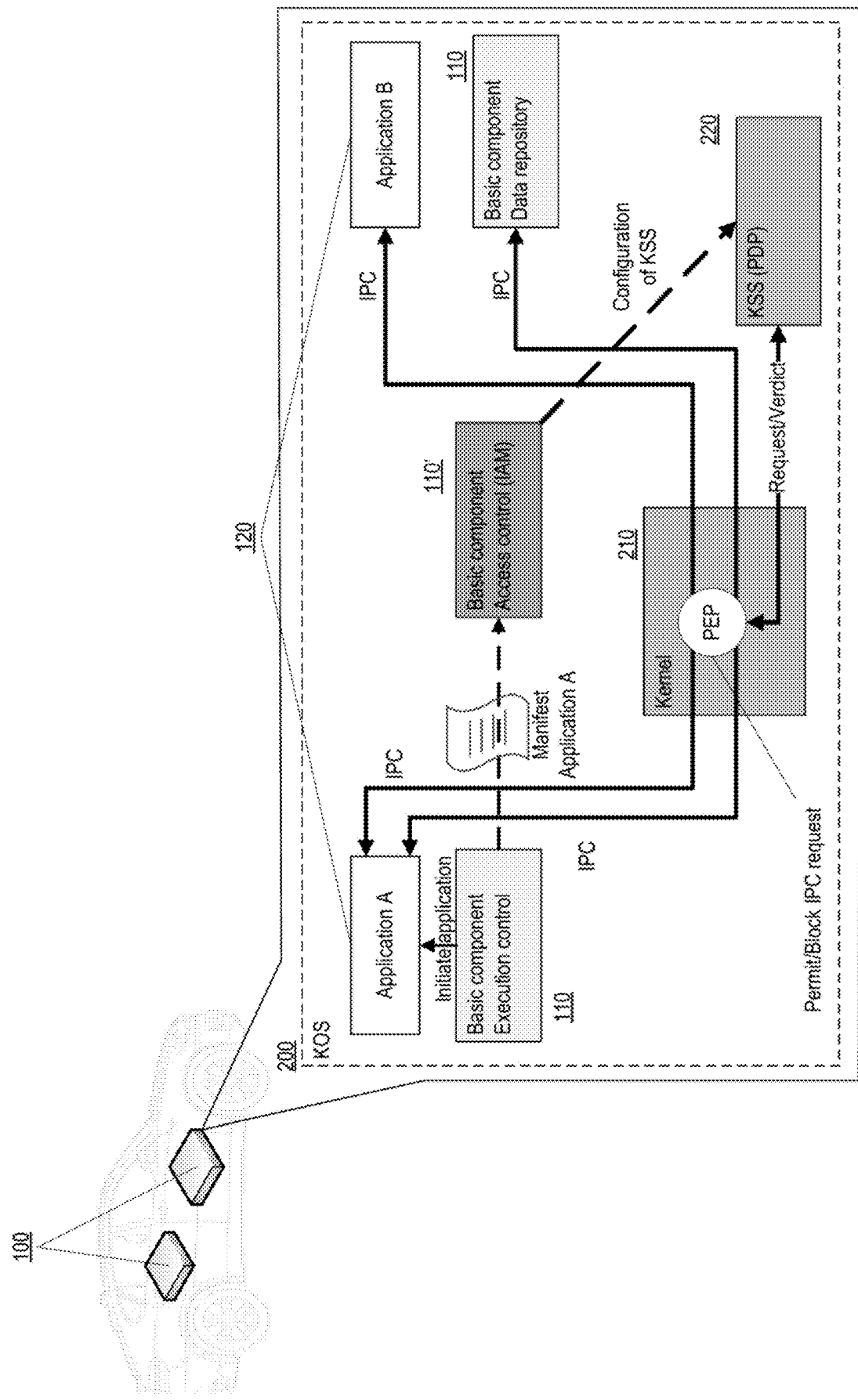
FIG. 2A illustrates a system for providing interprocess communication in an electronic control unit, in accordance with aspects of the present disclosure.

The indicated approaches have a substantial number of shortcomings, including, but not limited to:
- no compatibility between different embodiments of the AAP protocol;
- difficulty in specifying the required security policies and monitoring their properties, such as complete coverage, no incompatibilities, time to compute a decision on allowing an interaction, and others;
- uncontrollable increase in the trusted code base of the system, built from the AAP standard (the trusted code base is considered in greater detail in the description of FIG. 2A).

In order to eliminate these shortcomings, an implementation of the access control component 110' is proposed, in accordance with aspects of the present disclosure which will be described in detail below in conjunction with FIG. 2A.

FIG. 2A illustrates a system for providing interprocess communication in an electronic control unit, in accordance with aspects of the present disclosure.

The AAP standard defines requirements for providing information security for the systems and platforms implementing this standard. However, this standard provides only high-level requirements for the security subsystem and implementation details of this subsystem are not incorporated in the standard. The present disclosure describes one exemplary embodiment.

The text of the AAP standard discusses various approaches to the implementation. For example, one implementation may utilize several PDP and PEP points, and these PDP and PEP points themselves may be implemented, as mentioned above, in the form of supplemental applications 120 running under the control of AAP platform. The use of this approach does not allow (or at least significantly complicates) the creation of a security subsystem with specified properties. Such properties may include completeness of description of the security policies, their mutual compatibility, assurance of trust in the code of the PDP and PEP, and specification of comprehensive security policies. Furthermore, this approach does not allow implementation of the security properties already described in the AAP standard for its basic components 110.

The trusted code base of a system built based on the AAP standard includes a set of components ensuring the security of the system, so that a compromising or improper working of any of these components may result in a disruption of the security attributes of the system as a whole. The trusted code base of the system is the aggregate of the entire code of the information system (in the present exemplary embodiment, the system of the AAP standard) in which a disruption of the operation (errors, vulnerabilities) may affect the security goals. The security goals, in turn, may be the requirements pertaining to the security of the information system that are to be fulfilled under all possible operating conditions of the information system.

Examples of requirement(s) pertaining to the security of an information system may include, but are not limited to:
confidentiality, integrity,
accessibility,
others.

Thus, the code of both the PDP and the PEP is included in the trusted code base of a system built on the AAP standard. However, when one needs to specify the security attributes of a complex system built from the AAP standard, it is hard to guarantee a proper working of the PDP and the PEP points, unless additional steps are taken.

As an example of such steps, one may consider the formal verification (for example, a verification by formal mathematical methods) of the implementation of the PDP and the PEP or the generation of the code of the PDP and the PEP based on rules enabling a guarantee of their proper working.

Originally, as was mentioned above, the AAP standard contemplates the mentioned access control component 110', being a point for checking the processes of intercommunication occurring in the system based on the AAP standards. Embodiments of the present invention propose, while keeping the software interface of the access control component 110', a changing of its functionality as described below.

Specifically, embodiments of the present invention contemplate an AAP software platform that is based on a secure operating system. An example of a secure operating system is KasperskyOS 200 (KOS).

Generally, a secure OS guarantees the functional and informational security. The guarantee of the functional security includes measures for protecting against problems arising due to combinations of random factors acting on the OS and having a random nature. For example, from the standpoint of functional security (or safety), a situation may arise with a certain probability in which a crash occurs in the OS. The goal of assuring a functional security is to reduce the number of probable crashes to a required level (for example, not more than 7-10 per day). The guarantee of informational security includes measures to protect against problems caused by deliberate actions on the OS (such as cyber-attacks). For example, from the standpoint of informational security, if a vulnerability of the OS is known, then the probability of a successful attack is equal to 1. The goal of assuring the informational security (i.e., absence of vulnerabilities) is the main goal of a secure OS.

Figure 2B:
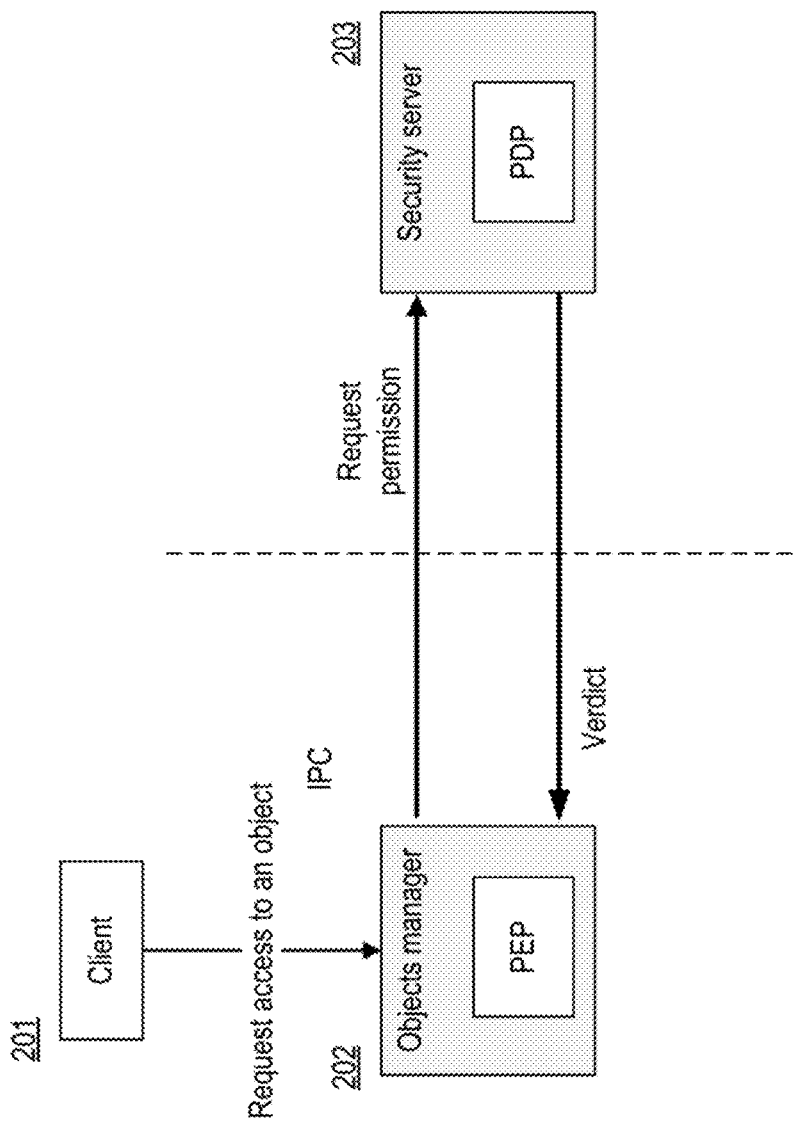
FIG. 2B illustrates the Flux Advanced Security Kernel (FLASK) architecture, in accordance with aspects of the present disclosure.

The essential attributes of the KasperskyOS 200 make it possible to realize a security subsystem for an AAP corresponding to the MILS (Multiple Independent Levels of Security) architecture. The MILS architecture is based on partitioning of the system into isolated trusted and untrusted components and monitoring of the interactions (intercommunication) between them. The MILS architecture is further based on the FLASK (Flux Advanced Security Kernel) architecture, which in turn is based on partitioning of the security system into two parts, PDP and PEP. An example of the FLASK architecture is presented in FIG. 2B. In the event of a client 201 requesting access to an object, the objects manager 202 requests a verdict from the security server 203 and, based on the decision (verdict) of the security server, grants access to the object by the client.

One feature of the secure operating system, such as KasperskyOS 200, is its ability to monitor the interprocess communications in the system, and by using a set of formalized security models, the secure operating system makes it possible to specify maximum detailed security policies for the interactions. This functionality is provided by a separate subsystem of the KasperskyOS 200, known as the Kaspersky Security System (KSS) 220, shown in FIG. 2A.

It should be noted that the mechanisms of interprocess communications which are implemented in the KasperskyOS 200 are described in U.S. Pat. No. 9,201,712 (entitled "System and method for selecting a synchronous or asynchronous interprocess communication mechanism"), which is incorporated by reference herein in its entirety, while the subsystem KSS 220 is described in the U.S. Pat. No. 9,774,568 (entitled "Computer security architecture and related computing method"), which is also incorporated by reference herein in its entirety.

Figure 2C:
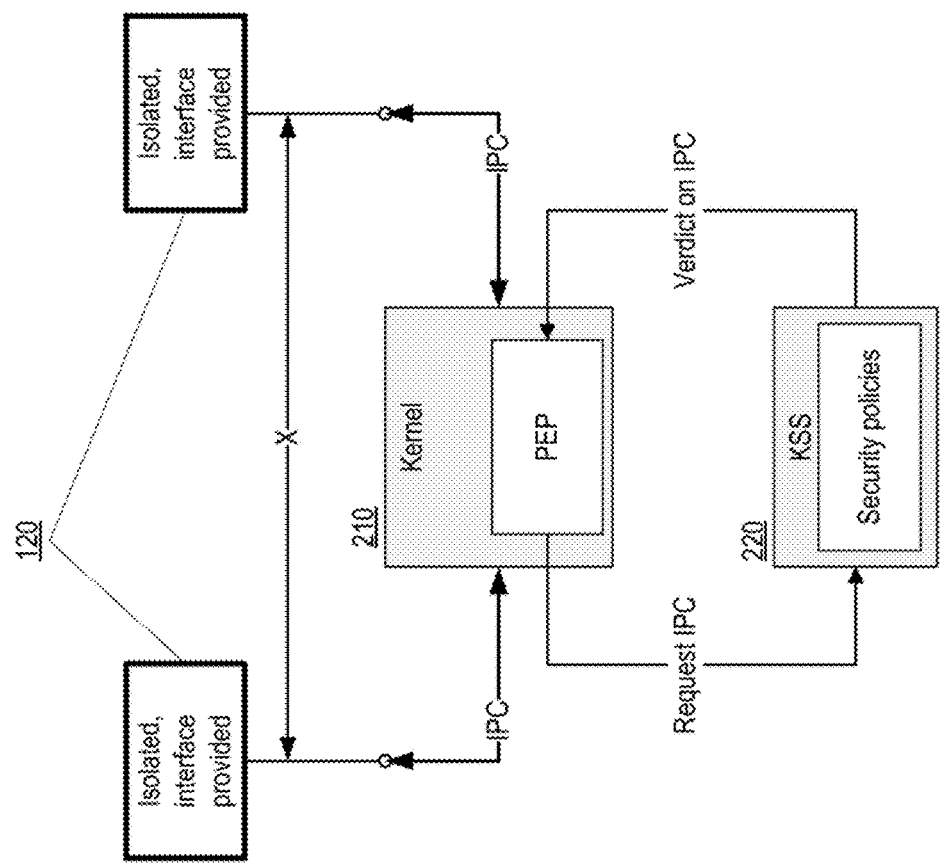
FIG. 2C illustrates the interprocess communication in an exemplary secure operating system, in accordance with aspects of the present disclosure.

The only possible mechanism of interprocess communication between software components running under the control of the KasperskyOS is an IPC provided by the kernel (microkernel) 210 of the operating system 200. This mechanism of communication is presented in FIG. 2C. According to an aspect of the present invention, in the process of carrying out the IPC between applications 120, the kernel 210 may request a verdict or permission from the KSS 220 to carry out the IPC (verdict on granting access for the interaction). The KSS 220 has access to the data being transferred in the IPC process and performs an analysis of these data in accordance with specified security policies. In general case, the specified security policies may be defined in the stage of compilation and cannot be changed. In an embodiment of the present invention, the KSS 220 may compute a verdict with respect to the granting of access for the interaction, utilizing formalized security models. The computed verdict may be used by the kernel 210 to carry out the interprocess communication.

In an aspect, the formalized security models may include but are not limited to:
mandatory access control (Bella-Lapadula model);
mandatory integrity control (Biba model);
role-based access control model;
security models based on finite state machines;
security models based on various dialects of temporal logic;
others.

Furthermore, in one exemplary embodiment the KSS 220 can additionally provide an interface to the software components (the security interface KSS). According to an embodiment of the present invention, such interface may be used for specifying the parameters of the security policies, as well as for receiving from the KSS 220 verdicts as to whether certain actions can or cannot be performed.

As an example, the procedure for providing access to a service of application B 120 from application A 120 is illustrated. At the beginning, after the system is loaded, all interprocess communications between applications A and B are prohibited. This means that when such a communication is attempted, the kernel 210 will ask permission from KSS 220 to perform that interprocess communication and will receive a response that such communication is not possible, after which the attempt to perform this interprocess communication will be blocked.

However, if the specification of application A 120 contains a statement that it is possible to interact with the service of application B 120, then the access control component 110' after obtaining this specification will perform an analysis thereof with the purpose of determining the integrity and authenticity of this specification. In addition, the access control component may obtain information that describes the permissible interactions. Then the access control component 110', having the exclusive right to modify the parameters of the security configuration of the design, may specify through the security interface KSS 220 a parameter of the security configuration indicating the possibility of performing the interaction. After this, when an attempt is made to access the service of application B 120 from application A 120, KSS 220 will issue an affirmative verdict, and the interaction can be performed.

Following is the example of a simple security policy allowing the above described behavior to be performed.

Application A 120 may have an identifier ID_A, which can be determined independently of the application by the kernel 210 of the OS. Similarly, the application B 120 may have an identifier ID_B. The identifier may be, for example, the ID of a process associated with that application. Moreover, application B 120 may have a set of services (for example, interface methods), each of which has its own identifier. The values of these identifiers may be specified in the specification of application B 120. The specification of application A 120 may contain a statement that it is possible to obtain access to the service of application B 120, having the identifier ID_SERVICE_B_1.

In the process of exchanging information, the kernel 210 of the OS has access to all these parameters, accordingly, and the kernel 210 may transmit these parameters to the KSS 220 in order for KSS 220 to pronounce a verdict as to whether an interaction can or cannot be performed.

In an embodiment, the KSS 220 may implement a security policy which is constructed as follows. There is a list (the "list" type container is used to simplify the discussion, in actual embodiments other containers may be used, such as a "glossary", making it possible to reduce the time for computing a verdict), containing a triplet of data elements, which may include the identifier of the client application, the identifier of the service application, and the identifier of the service at the service application. This list may be empty at the startup of the system. For the decision making, the KSS 220 may receive, for each interprocess communication, a list of the identifiers making up the data elements, and may perform a search using the list. If a given triplet of data elements is present on the list, the communication is allowed. Otherwise, the communication is prohibited.

In an embodiment, the access control component 110' may have access to the security interface KSS 220 and may add new data elements to the list through this interface.

Upon analyzing the specification of the applications, the access control component 110' may discover the interactions which are permitted, may obtain their corresponding identifiers, and may use the security interface to add them to the list of the security policy of KSS 220. Other interactions are prohibited, as before.

Thus, the disclosed embodiments assure the following attributes:

1. The verification is performed at a point where all interprocess communications take place in the system, the kernel 210 of the OS, which eliminates the possibility of performing an interprocess communication that has not been verified.

2. The described system has a single decision making point (PDP), operating with the use of formal security models. Such configuration substantially guarantees complete and noncontradictory security policies, computes the verdicts for granting access to an interprocess communication in a predictable time, and utilizes formal mechanisms to assess the quality of this security model (for example, the decision making time). In the mentioned MILS architecture it is recommended to have one (single) PDP in the system, operating at the lowest level of the operating system (in the kernel 210, as mentioned above), which is in fact is implemented in the proposed approach.

3. The secure operating system substantially guarantees that all interprocess communications are under the supervision of the KSS 220. The rules for an interprocess communications are written in high-level language. The code for computing verdicts may be generated, which allows a high level of trust in the components (the applications 120) for which the verdicts are computed in the KSS 220. For example, a rule may state that component A cannot have access to component B. But the rule may also state that component A has access to component C, and component C has access to component B. By using an integrity model, the KSS 220 will discover that this set of rules is incorrect, and an error will be put out during the stage of analyzing the security configuration.

Advantageously, embodiments of the present invention contemplate an approach which makes it possible to meet the requirements of the AAP standard and at the same time utilize the advantages of the security paradigm provided by the secure operating system, such as KasperskyOS.

The main difference between the proposed approach and other similar approaches is the fact that the access control component 110' is neither a component implementing security policies nor a component enforcing verdicts. In the case of the proposed architecture, the access control component 110' is only a mechanism for configuring the global security policy, so that the access control component 110' can be significantly simplified. This simplification of the access control component 110' makes possible a detailed analysis thereof for the purpose of identifying potential vulnerabilities and errors. The actual security policies, the mechanism for computing verdicts and enforcing verdicts are implemented independently in the kernel 210 of the OS with the use of KSS 220.

Thus, the control unit 100 of the vehicle may operate under the control of the secure operating system 200, which is designed to execute the applications for control of the vehicle 120 and the basic components 110. The secure operating system 200 contains a kernel 210 and a security module 220. The basic components 110 are executed in the secure operating system 200 and provide interfaces for interaction with the applications 120 and other basic components 110. A basic component 110 here is an isolated application 120 (according to the MILS architecture). The applications for control of the vehicles 120 are also executed in the secure operating system 200 and communicate with the basic components 110 and other applications 120 via the mentioned intercommunication interfaces and provide interfaces for communicating with other applications 120. In the general case, these communication interfaces are interprocess communication interfaces.

The kernel of the secure operating system 210 enables an interprocess communication between the basic components 110 and the applications for control of the vehicle 120 through the mentioned interfaces. For this, the kernel 210 intercepts requests for communication of an application 120 with a basic component 110 through the provided communication interface. The enabling of the interprocess communication thereafter occurs on the basis of a verdict of the security module of the secure operating system 220.

In an embodiment of the present invention, the security module of the secure operating system 220 is the sole decision making point for granting access. In an embodiment, the security module of the secure operating system 220 may use a formalized security model to compute a verdict on granting access to the basic components 110 through the mentioned interaction interfaces. The verdict on granting access may be pronounced by the security module of the secure operating system 220 if the communication between the basic components 110 and the applications for control of the vehicle 120 complies with the mentioned formalized security model.

In an embodiment, the kernel 210, based on the verdict of the security module of the secure operating system 220, may selectively enable the interprocess communication between the basic component 110 and the application 120 via the interaction interface. In the event that a verdict is pronounced granting access, the kernel 210, in one exemplary embodiment, may send the intercepted request for the interprocess communication of the application 120 with the basic component 110 to the basic component 110 through the provided interprocess communication interface.

Figure 3:
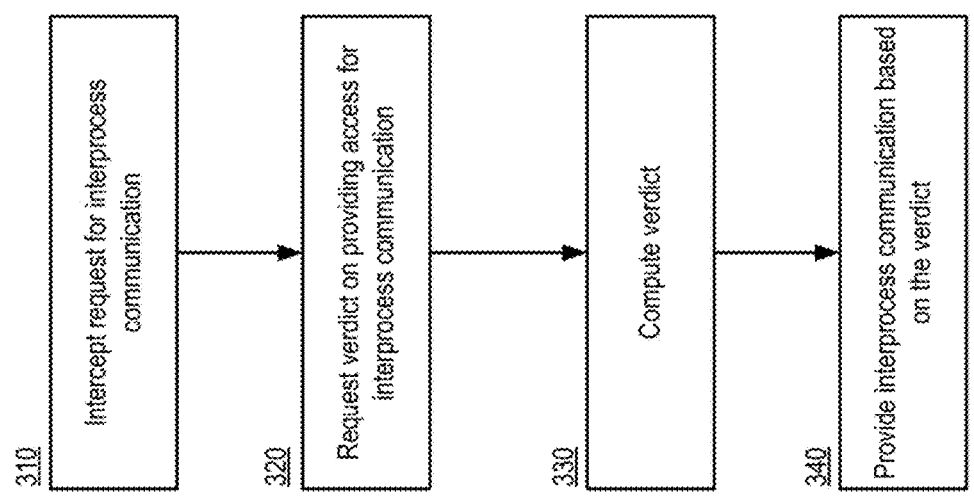
FIG. 3 illustrates a method for providing an interprocess communication in an electronic control unit, in accordance with aspects of the present disclosure.

FIG. 3 illustrates a method for providing an interprocess communication in an electronic control unit, in accordance with aspects of the present disclosure.

At the starting step 310, the kernel of the operating system 210 in the electronic control unit 100 may be used to intercept a request for interprocess communication of the control application of the vehicle 120 with a basic component 110. In an embodiment, the operating system is a secure operating system, such as the KasperskyOS (as discussed above in conjunction with FIG. 2A). The basic component 110 is a software element of the platform as defined in the AAP specification (as discussed above in conjunction with FIG. 1A). The basic component 110 here is an isolated application 120 (according to the MILS architecture) and it provides an interface for interaction with other applications 120. In an embodiment, the basic component 110 and the application 120 provide interfaces for interprocess communication with other basic components 110 and other applications 120.

At step 320, the kernel of the operating system 210 may request a verdict from the security module of the operating system 220 with respect to granting of access for an interprocess communication of the application 120 with the basic component 110 through the interprocess communication interface. The security module of the operating system 220 is the sole decision making point here (in compliance with the FLASK architecture), namely, the sole point for computing verdicts as to the granting of access.

At step 330, the security module of the operating system 220 may be used to compute (pronounce) a verdict on the granting of access for the interprocess communication of the application 120 with the basic component 110 through the interprocess communication interface. In an embodiment, the security module of the operating system 220 may compute a verdict in accordance with security policies which have been defined during the compiling step and cannot be changed. In an embodiment, the security module of the operating system 220 may compute the verdict by using a formalized security model (as discussed above in conjunction with FIG. 2A). The computed verdict may allow an interprocess communication between the basic component 110 and the application for control of the vehicle 120 if the communication between the basic component 110 and the application 120 complies with the formalized security model.

At step 340, the kernel of the secure operating system 210, based on the verdict of the security module of the operating system 220 enables the interprocess communication between the basic component 110 and the application for control of the vehicle 120.

Figure 4:
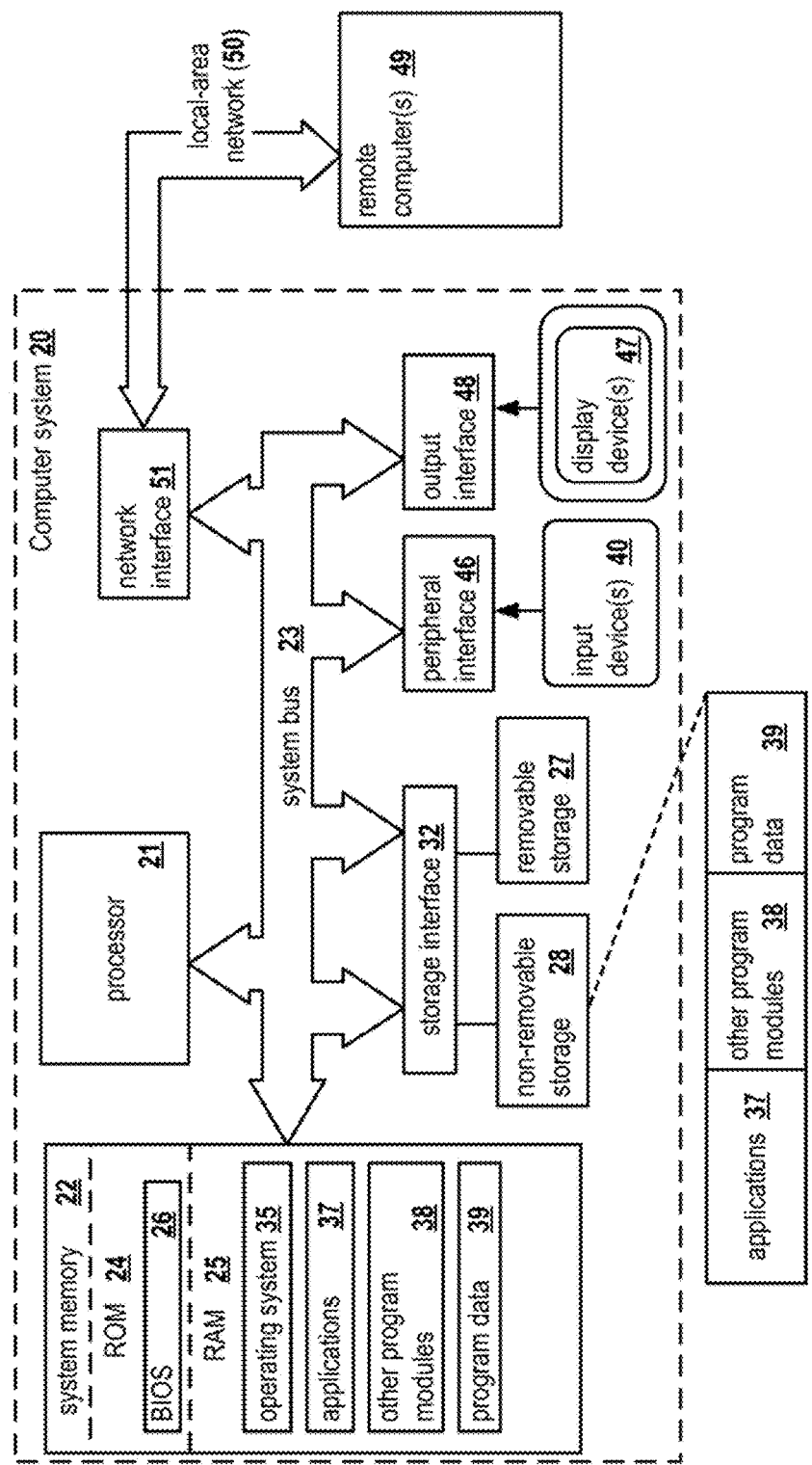
FIG. 4 shows an example of a general-purpose computer system which can implement aspects of the present disclosure.

FIG. 4 is a block diagram illustrating a computer system 20 on which aspects of systems and methods for providing an interprocess communication in an electronic control unit may be implemented in accordance with an exemplary aspect. The computer system 20 may represent an electronic control unit of the vehicle of FIG. 3A and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing an interprocess interaction in an electronic control unit having an operating system defining a kernel space, the method comprising:

intercepting, by the kernel of the operating system, a request for an interprocess communication between a first application and a second application of the electronic control unit;

requesting a verdict, from an access control component of the operating system, with respect to granting access for the requested interprocess communication between the first application and the second application of the electronic control unit;

generating, by the access control component, the verdict for the requested interprocess communication based on a security policy, wherein the security policy includes a list containing a plurality of data elements, wherein each of the plurality of data elements indicates at least an identifier of a client application, an identifier of a service application and an identifier of a service allowed to be performed by the service application, wherein the kernel sends to the access control component an identifier of the first application, an identifier of the second application and an identifier of a service to be performed by the second application, wherein the access control component generates an affirmative verdict in response to finding in the list a data element matching the identifier of the first application, the identifier of the second application and the identifier of the service and wherein the access control component generates a negative verdict in response to not finding in the list a data element matching the identifier of the first application, the identifier of the second application and the identifier of the service; and selectively allowing, by the kernel of the operating system, the requested interprocess communication between the first application and the second application based on the generated verdict.

2. The method of claim 1, wherein the access control component has an exclusive authority to make access grant decisions with respect to the interprocess communication.

3. The method of claim 1, wherein the kernel allows the requested interprocess communication based on the affirmative verdict generated by the access control component and wherein the kernel blocks the requested interprocess communication based on the negative verdict generated by the access control component.

4. The method of claim 1, wherein the list is created based on a specification defining access of a corresponding application to one or more services of a different application.

5. The method of claim 4, wherein the specification includes at least one or more computing resources required by the corresponding application, run time environment conditions required by the corresponding application, one or more interfaces provided by the corresponding application.

6. A system for providing an interprocess interaction in an electronic control unit having an operating system defining a kernel space, the system comprising:

a hardware processor configured to:

intercept, by the kernel of the operating system, a request for an interprocess communication between a first application and a second application of the electronic control unit;

request a verdict, from an access control component of the operating system, with respect to granting access for the requested interprocess communication between the first application and the second application of the electronic control unit;

generate, by the access control component, the verdict for the requested interprocess communication based on a security policy, wherein the security policy includes a list containing a plurality of data elements, wherein each of the plurality of data elements indicates at least an identifier of a client application, an identifier of a service application and an identifier of a service allowed to be performed by the service application, wherein the kernel sends to the access control component an identifier of the first application, an identifier of the second application and an identifier of a service to be performed by the second application, wherein the access control component generates an affirmative verdict in response to finding in the list a data element matching the identifier of the first application, the identifier of the second application and the identifier of the service and wherein the access control component generates a negative verdict in response to not finding in the list a data element matching the identifier of the first application, the identifier of the second application and the identifier of the service; and selectively allow, by the kernel of the operating system, the requested interprocess communication between the first application and the second application based on the generated verdict.

7. The system of claim 6, wherein the access control component has an exclusive authority to make access grant decisions with respect to the interprocess communication.

8. The system of claim 6, wherein the kernel allows the requested interprocess communication based on the affirmative verdict generated by the access control component and wherein the kernel blocks the requested interprocess communication based on the negative verdict generated by the access control component.

9. The system of claim 6, wherein the list is created based on a specification defining access of a corresponding application to one or more services of a different application.

10. The system of claim 9, wherein the specification includes at least one or more computing resources required by the corresponding application, run time environment conditions required by the corresponding application, one or more interfaces provided by the corresponding application.

11. A non-transitory computer readable medium storing thereon computer executable instructions for providing an interprocess interaction in an electronic control unit having an operating system defining a kernel space, including instructions for:

intercepting, by the kernel of the operating system, a request for an interprocess communication between a first application and a second application of the electronic control unit;

requesting a verdict, from an access control component of the operating system, with respect to granting access for the requested interprocess communication between the first application and the second application of the electronic control unit;

generating, by the access control component, the verdict for the requested interprocess communication based on a security policy, wherein the security policy includes a list containing a plurality of data elements, wherein each of the plurality of data elements indicates at least an identifier of a client application, an identifier of a service application and an identifier of a service allowed to be performed by the service application, wherein the kernel sends to the access control component an identifier of the first application, an identifier of the second application and an identifier of a service to be performed by the second application, wherein the access control component generates an affirmative verdict in response to finding in the list a data element matching the identifier of the first application, the identifier of the second application and the identifier of the service and wherein the access control component generates a negative verdict in response to not finding in the list a data element matching the identifier of the first application, the identifier of the second application and the identifier of the service; and selectively allowing, by the kernel of the operating system, the requested interprocess communication between the first application and the second application based on the generated verdict.

12. The non-transitory computer readable medium of claim 11, wherein the access control component has an exclusive authority to make access grant decisions with respect to the interprocess communication.

13. The non-transitory computer readable medium of claim 11, wherein the kernel allows the requested interprocess communication based on the affirmative verdict generated by the access control component and wherein the kernel blocks the requested interprocess communication based on the negative verdict generated by the access control component.

14. The non-transitory computer readable medium of claim 11, wherein the list is created based on a specification defining access of a corresponding application to one or more services of a different application.

* * * * *